United States Patent
O'Connor et al.

(10) Patent No.: US 10,469,662 B2
(45) Date of Patent: Nov. 5, 2019

(54) SYSTEM AND METHOD FOR MANAGING CUSTOMER INTERACTIONS IN AN ENTERPRISE

(71) Applicant: Avaya Inc., Santa Clara, CA (US)

(72) Inventors: Neil O'Connor, Galway (IE); Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 619 days.

(21) Appl. No.: 14/299,153

(22) Filed: Jun. 9, 2014

(65) Prior Publication Data
US 2015/0358463 A1 Dec. 10, 2015

(51) Int. Cl.
*H04M 1/64* (2006.01)
*H04M 3/51* (2006.01)
*G06Q 10/06* (2012.01)
*G06Q 30/00* (2012.01)
*H04M 3/523* (2006.01)
*H04M 3/493* (2006.01)

(52) U.S. Cl.
CPC .... *H04M 3/5166* (2013.01); *G06Q 10/06313* (2013.01); *G06Q 10/06315* (2013.01); *G06Q 30/016* (2013.01); *H04M 3/4936* (2013.01); *H04M 3/5175* (2013.01); *H04M 3/523* (2013.01)

(58) Field of Classification Search
CPC .................................................. H04M 3/2281
See application file for complete search history.

(56) References Cited

U.S. PATENT DOCUMENTS

| 6,054,928 | A | * | 4/2000 | Lemelson | G08B 21/0233 340/539.1 |
|---|---|---|---|---|---|
| 6,859,528 | B1 | * | 2/2005 | Welte | H04M 1/6505 379/210.02 |
| 7,106,843 | B1 | * | 9/2006 | Gainsboro | H04M 3/2281 379/191 |
| 8,130,935 | B1 | * | 3/2012 | Coughlan | H04M 3/5232 379/265.02 |
| 8,531,501 | B2 | * | 9/2013 | Portman | H04M 3/5133 348/14.02 |
| 9,014,364 | B1 | * | 4/2015 | Koster | G10L 15/1815 379/265.01 |
| 9,299,343 | B1 | * | 3/2016 | Koster | G10L 15/1815 |
| 9,307,084 | B1 | * | 4/2016 | Pycko | H04M 3/5166 |
| 9,350,866 | B1 | * | 5/2016 | Mekonnen | H04M 3/428 |
| 9,473,634 | B1 | * | 10/2016 | Ouimette | H04M 3/5175 |
| 2003/0174830 | A1 | * | 9/2003 | Boyer | H04M 3/51 379/265.02 |

(Continued)

*Primary Examiner* — Joseph T Phan
(74) *Attorney, Agent, or Firm* — Stevens & Showalter, L.L.P.

(57) ABSTRACT

An automated system of an enterprise is disclosed for managing a communication session with a customer of the enterprise. The automated system includes a monitoring module configured to monitor one or more attributes associated with the communication session. The automated system further includes an analysis module configured to determine a plurality of resources required for managing the communication session based on the attributes. The automated system further includes a management module configured to manage allocation of the resources for the communication session, wherein the allocation is refined during the communication session based on the attributes.

20 Claims, 5 Drawing Sheets

(56) References Cited

U.S. PATENT DOCUMENTS

| | | | |
|---|---|---|---|
| 2004/0022382 A1* | 2/2004 | Sweeney | H04M 3/4931 379/218.01 |
| 2004/0249650 A1* | 12/2004 | Freedman | G06Q 30/02 705/7.29 |
| 2007/0071206 A1* | 3/2007 | Gainsboro | H04M 3/2281 379/168 |
| 2008/0304643 A1* | 12/2008 | Hodge | H04M 1/67 379/188 |
| 2011/0010173 A1* | 1/2011 | Scott | H04M 3/42221 704/235 |
| 2011/0307258 A1* | 12/2011 | Liberman | G10L 15/26 704/251 |
| 2015/0213800 A1* | 7/2015 | Krishnan | H04M 3/4936 704/246 |

* cited by examiner

SYSTEM AND METHOD FOR MANAGING CUSTOMER INTERACTIONS IN AN ENTERPRISE

BACKGROUND

1. Field of the Invention

Embodiments of the present invention generally relate to a system and method for managing interactions with customers of an enterprise and particularly to a system and method for automatically constituting team of suitable resources for managing the customer interactions.

2. Description of Related Art

Contact centers are employed by many enterprises to service inbound and outbound contacts from customers. Primary objective of the contact center management is to ultimately maximize contact center performance and profitability. An ongoing challenge in contact center administration is monitoring and optimizing contact center efficiency. Efficiency of a contact center is broadly dependent upon its ability to satisfy their customers. Hence, automated systems are highly required that are able to manage customer communications. Fortunately, a number of such technologies are known in the art, one of which is IVR (Interactive Voice Response) technology.

IVR systems drastically improve customer satisfaction levels of contact centers by significantly improving on customer call-response-time. For example, IVR systems known in the art are capable of presenting solutions of a list of commonly-asked-queries to the contact center customers for facilitating them in resolving their queries without even interacting with a human resource. This technique takes off a lot of work load from human resources of the contact centers and hence reduces operational costs of the contact centers significantly. Moreover, this technique significantly reduces customer call-response-time as the customers are not required to wait in queue for a human resource to answer their calls. Hence, the IVR technology adds on to the customer satisfaction levels.

Recently, the IVR technology has advanced drastically and is now capable of handling significant work load of the contact centers. One of the recent advancements in the IVR technology enables the contact centers to determine content and context of the customer calls by using speech analysis systems. Speech analysis systems are used to interpret each and every word spoken by the customers in order to determine objectives of the customer calls. The contact center may use certain pre-set keywords to identify words spoken by the customers for determining objectives of the customer calls. Such identified objectives may be used by the contact centers to automatically route the customer calls to a suitable agent from a relevant department to ensure customer satisfaction.

Further, another one of the recent advancements in the IVR technology enables the contact centers to determine emotions or sentiments (e.g., happy, sad, angry etc.) of the customers by using the speech analysis systems. Such emotions may be used by the contact centers to determine importance or essence of the customer calls. Further, such emotions may be used by the contact centers for better identifying an agent to ensure best service for their customers.

Undoubtedly, such advancements in the contact center technologies have leveled up the contact center efficiencies in various departments. However, certain technology areas in the contact centers are still untouched. For example, in spite of the efficiency of the contact centers to automatically route a customer call to a relevant agent, the call routing technology is limited to its one time call routing technology, i.e., a call of a customer can only be routed one time to a suitable agent and then the agent becomes responsible for manually routing the call further to another agents depending upon the requirements or queries of the customers. Such manual routing of calls between the contact center agents is hectic and results in dissatisfaction of the customers.

For example, if a customer is routed to a department of 'personal loans' in a finance enterprise, and the customer starts complaining about the 'security' department to an agent from 'personal loan', then the contact center agent is responsible find suitable agents from the 'security' department. The agent may first need to find contact numbers of the 'security' department and then to find a suitable person in the security department (who may be busy or unavailable) to route the customer to etc. Therefore, the customer may need to wait a lot on the call while the call manually gets routed to other suitable agents.

There is thus a need for a system and method to provide an automated mechanism for continuously monitoring customer calls to determine a plurality of suitable agents required to serve the customers.

SUMMARY

Embodiments in accordance with the present invention provide a system for managing a communication session with a customer of an enterprise. The system includes a monitoring module configured to monitor one or more attributes associated with the communication session. The system further includes an analysis module configured to determine a plurality of resources required for managing the communication session based on the attributes. The system further includes a management module configured to manage allocation of the resources for the communication session, wherein the allocation is refined during the communication session based on the attributes.

Embodiments in accordance with the present invention further provide a computer-implemented method managing a communication session with a customer of an enterprise. The computer-implemented method includes monitoring one or more attributes associated with the communication session, determining a plurality of resources required for managing the communication session based on the attributes, and managing allocation of the resources for the communication session, wherein the allocation is refined during the communication session based on the attributes.

Embodiments in accordance with the present invention further provide a computer-implemented method for managing customer interactions in an enterprise. The computer-implemented method includes determining at least one objective of an on-going customer communication, allocating one or more resources to manage the on-going customer communication based on the monitored at least one objective, monitoring the on-going customer communication to determine emotion of the customer, and refining allocation of resources for managing the on-going customer communication based on the emotion of the customer.

The present invention can provide a number of advantages depending on its particular configuration. First, the present invention addresses a problem of automatically detecting when a diverse-group of business resources are required for handling an identified business problem. Further, the present invention is also capable of automatically assembling the diverse-group of resources in real time in response to the identified business problem. In addition, the present invention furthermore capable of making on-going changes in the constitution of the diverse group of resources based on the progress of the situation. For example, in an Contact Center environment where a complex problem has been identified using speech analytics systems, and it is determined that a diverse team of multiple resources (from different departments of the contact center) is required to monitor the progress towards resolution of the problem, The present invention is not only capable of constituting the required team, but is also capable of making continual changes to the constitution of the team working on the problem based on the progress towards resolution of the issue.

Next, the present invention allows automatic detection of existence of a problem based on voice or video interactions with customers of enterprises. The present invention further facilitates automated assembling of a diverse set of multiple resources specific to the nature of the detected problem. In addition, the present invention continues to refine the resource team working on the problem based on monitored satisfaction levels of the customers.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
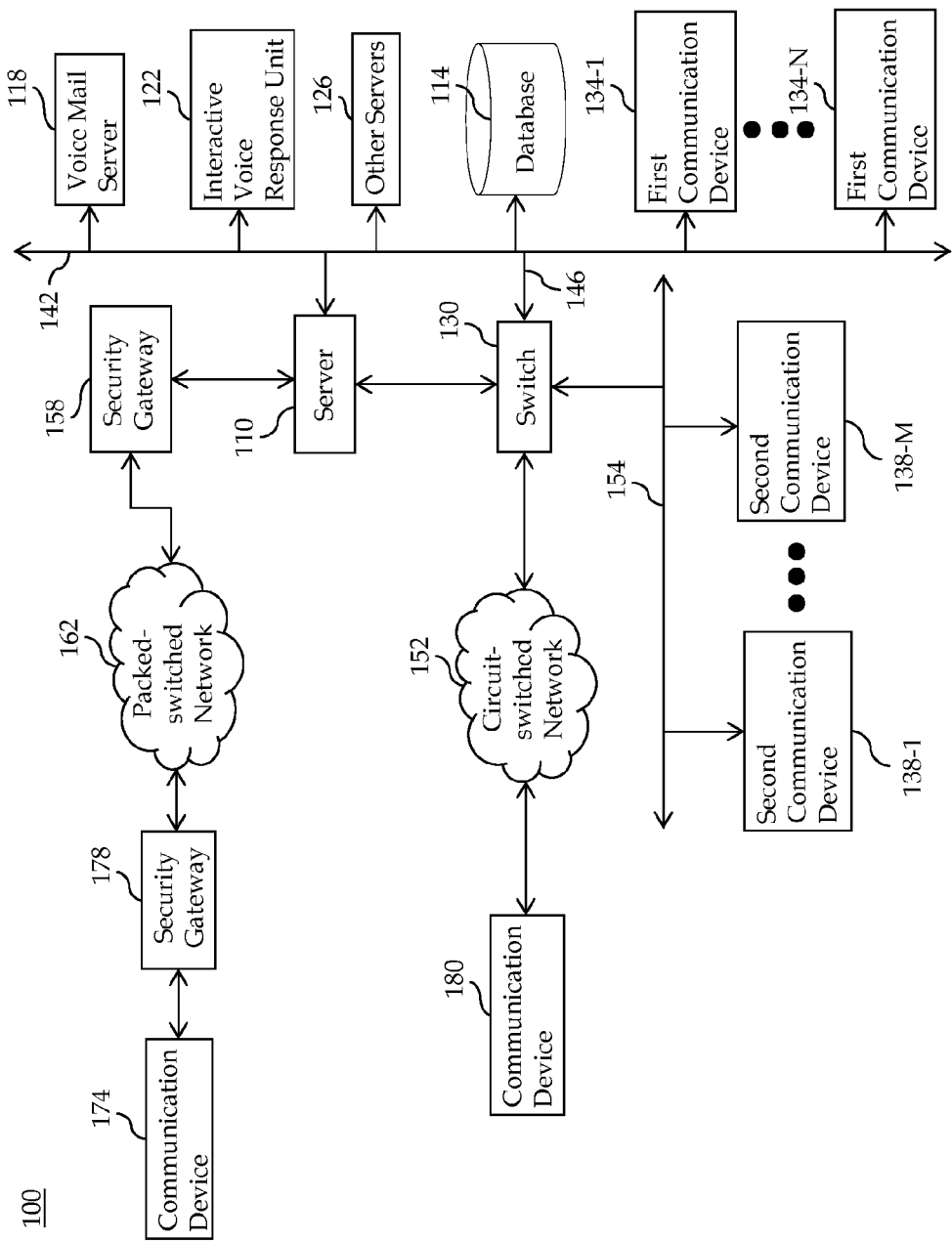
FIG. 1 illustrates a block diagram depicting a contact center according to an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a server 110, a set of data stores or database 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks.

Figure 2:
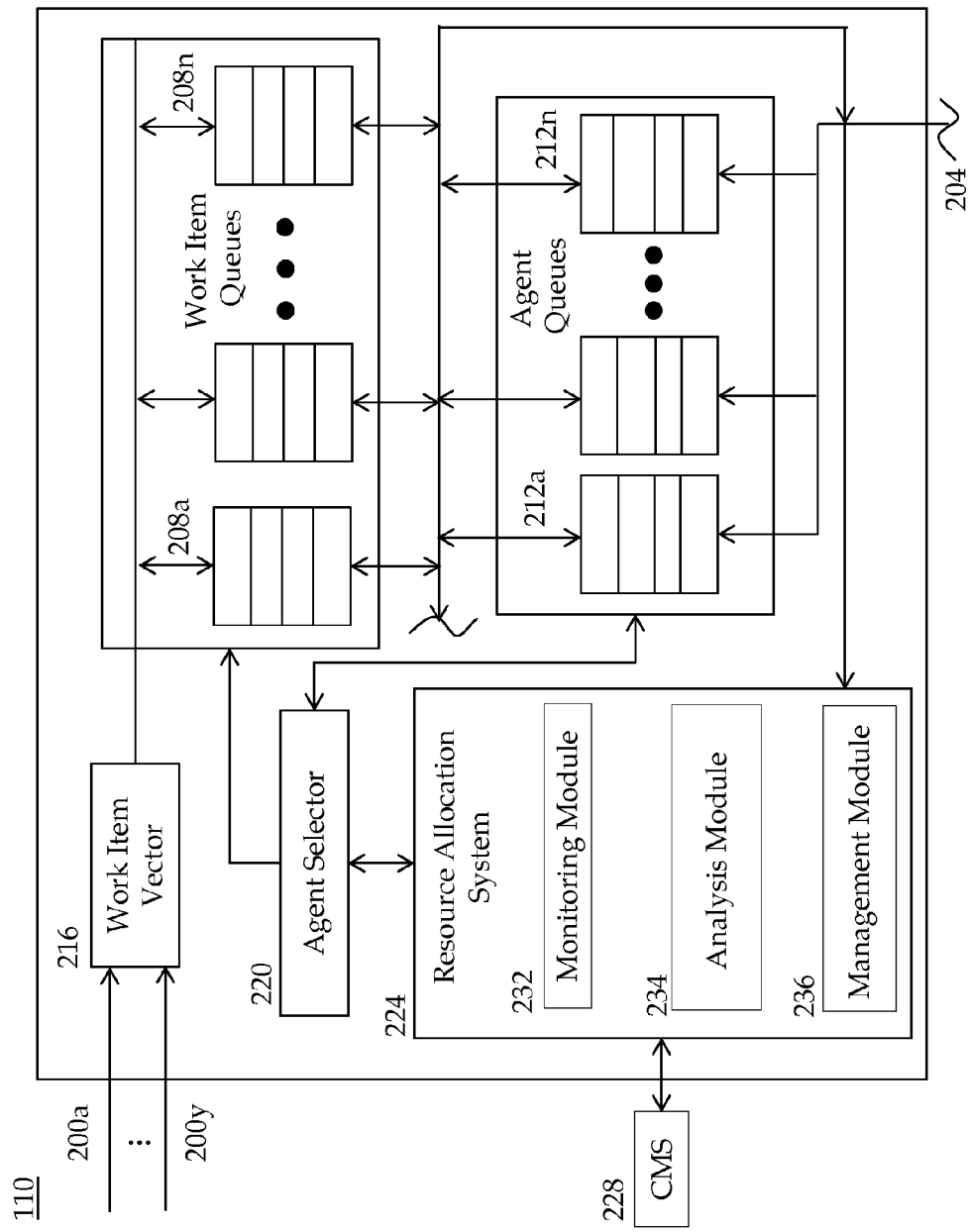
FIG. 2 illustrates a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers profile of agents of the contact center and monitors current status of the agents and parameters of the received work requests. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

As can be seen in FIG. 2, included among the data stored in the server 110 is a set of contact queues or work request queues 208a-n and a separate set of agent queues 212a-n. Each work request queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues 208a-n that correspond to a different priority. Likewise, each agent's queue 212a-n are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work request vector 216. Contacts incoming to the contact center are assigned by the work request vector 216 to different work request queues 208a-n based upon a number of predetermined criteria, including customer identity, customer needs, contact center needs, current contact center queue lengths, customer value, and the agent skill that is required for the proper handling of the contact. Agents who are available for handling work requests are assigned to the agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the work request queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext 1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, or server and first and second communication devices, i.e., the invention may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1 is for purposes of illustration only and should not be construed as limiting the invention to any particular arrangement of elements.

As will be appreciated, the server 110 is notified via the LAN 142 of an received work request by communications component (e.g., switch 130, fax server, email server, Web Server, and/or other servers) receiving the received work requests as shown in FIG. 1. The received work request is held by the receiving telecommunications component until the server 110 forwards instructions to the component to forward or route the work request to a specific contact center resource, such as the IVR unit 122, the voice mail server 118, and/or first or second communication device 134-1-N, 138-1-M associated with a selected agent. The server 110 distributes and connects these work requests to telecommunication devices of available agents based on the predetermined criteria noted above. When the server 110 forwards a voice contact (or first work request) to an agent, the server 110 also forwards customer-related information from the database 114 to the agent's computer work station for viewing (such as by a pop-up display) to permit the agent to better serve the customer of the contact center. Depending on the agent's profiles, their current working status, and parameters of the received work requests, the server 110 may assign a multichannel work request to the agents of the contact center. The agents process the received work requests or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the present invention, included among the programs executing on the server 110 are an agent selector 220 and a resource allocation system 224. The agent selector 220 and the resource allocation system 224 are stored either in the main memory or in a peripheral memory (e.g., disk, CD ROM, etc.) or some other computer-readable medium of the contact center. The agent selector 220 effects an assignment between available work requests (or contacts) and available agents in a way that tends to maximize contact center efficiency for the current contact center state. The agent selector 220 uses predefined criteria in selecting an appropriate agent to service the work request. The resource allocation system 224, in particular, obtains, for each of a plurality of contact center business goals or objectives, current status information of agents, or information respecting whether or not a corresponding metrics (for example, the service level agreement) is being met or unmet and/or a level to which the corresponding goal is being met or unmet. For example, exemplary metrics can be expressed as actual, average or median wait times in each work request queues 208a-n, actual, average, or median agent staffing levels in each agent queue 212a-n, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

According to an embodiment of the present invention, the resource allocation system 224 includes a monitoring module 232, an analysis module 234, and a management module 236.

The monitoring module 232 is configured to collect profile and data of resources or agents of the contact center in an embodiment of the present invention, wherein the agent data for providing customer services is obtained by the contact center in several ways and from several sources. A primary source for collecting the agent data may be the contact center itself. However, information included in the agent data may provide a limited view of the overall characteristics of the agent, specifically the characteristics of the agent with respect to the contact center. The agent profile may include agent's self-description, skill sets, likes, locations etc. The agent's skill sets include agent's interests, education and work histories, hobbies, hometowns, favourite sport teams and TV shows, cultural background, and so on. In an embodiment of the present invention, the agent profile is stored and maintained in the database 114 of the contact center.

As user herein, the term "agent skill set" refers to the set of agent/resource data that is used by the contact center to characterize an agent or resource. Such agent data may include biographical agent data, demographic agent data, and external or internal behavioural agent data, to name a few. The behavioural data may include the agent's history with respect to the contact center and/or any other entity or social media channel. However, the agent data is not limited in this regard and may include any other type of agent data used by the contact center to characterize or classify agents. Further, the agent data may include any other agent data collected from one or more sources external to the contact center. Additionally, the agent profile may be raw data or processed agent data. That is, the agent data may be analyzed to characterize the agent and thereafter used to provide customized or personalized services to the customer. For example, an agent profile may be a set of values associated with an agent and a set of characteristics, where the values are selected based on the agent data obtained. However, the disclosure is not limited in this regard and any other methods for evaluating agent data to provide services that may be used without limitation.

Accordingly, in another embodiments of the present invention, a secondary source of agent data is utilized, i.e., social media channels. In particular, the contact center is configured to access and monitor social media channels (not shown in figure) for the agent data. Such social media channels may include direct social media channel or indirect social media channel, and social media channels associated with a same or a different domain as compared to the domain of the contact center. As a result, the agent data collected may add additional aspects of the agent's interest. Thus, the agent data may more accurately reflect the overall characteristics of the agent and allows the contact center to provide more customized customer services to the customers. In an embodiment of the present invention, the agent's profile may be generated by mining agent's data from social media networks. For example, the agent's social media posting history may reveal a lot about the agent's skills related to the business (e.g., interested and proficient in solving mobile device problems), eloquence, communication style (e.g., "youthful", "mature", "techy", "trendy", "conservative", "in-depth"), enthusiasm, and other personality traits that may have a bearing on customer service. The profile of the agent of the contact center is updated automatically at configurable intervals.

The monitoring module 232 is further configured to collect/monitor attributes or details from the customer communication sessions such as content, context, call status, customer history, progress in duration of the call, emotion of the customer, sentiment of the customer, emotion of the agent etc. In an exemplary embodiment of the present invention, the monitoring module 232 of the resource allocation system 224 uses at least one of speech analysis system, image analysis system, and text analysis system for determining content, call status, and emotion/sentiment of the customer and agents. The speech analysis system may use a natural language processor to determine words spoken by the customers and the agents.

In an embodiment of the present invention, the communication sessions may be conference sessions where more than one agent may be communicating with the customer from distant geographical locations. Further, the conference session may be at least one of an audio session, video session, or group chat session (text conference session). In an embodiment of the present application, a text conference session may include at least two users. Furthermore, the monitoring module 232 may comprise an image processing system to determine emotions of customers from video conference sessions. In addition, a text analysis system may be used to detect emotions of the customers from the words used (e.g., abusive words, harsh words, appreciative words, etc.) by the customers, sentence cases, grammar, punctuation, idioms, metaphors, animated smilies, etc. used by the customers in a text conference session. The text conference session may be enabled via a text chat conference mixer, which mixes chats between plurality of users onto a single chatting platform allowing all the users to chat with each other at a single platform like a group chatting platform (as known in the art).

Similarly, a speech analysis system may be used to detect emotions of the customers from the pitch, tone, loudness, etc. of the voice of the customers. Furthermore, the speech analysis system may be used by the monitoring module 232 to interpret every word spoken in a communication session between a customer and plurality of agents. This technique is used to interpret content of the communication session to analyze query of the customer. Further, the call status of the communication session may be determined by certain predefined keywords such as, but not limited to, "bye", "thanks for calling", "sorry for the inconvenience" etc. Similarly, the monitoring module 232 may use the speech analysis system to detect emotions of the customers or the agents to determine whether they are "happy", "sad", "angry", "excited", "frustrated", and so on. For example, a call from an angry or frustrated customer may be given a highest priority or "rank 1", happy customers may have "rank 2", and so on.

It will be appreciated by those having ordinary skills in the art that each one of the speech analysis system, image analysis system (for video analysis), and text analysis system may be used either alone or in combination with each other for the purpose of detecting content, context, and emotions of customers from a conference session.

Further, the monitoring module 232 extracts context of the received work request based on the inputs selected by the customer in an IVR menu, in an embodiment of the present invention. For example, inputs (e.g., selected button "5" for a "personal loan policy", and "2" for "inquiry") selected by the customer in the IVR menu may generate that the customer desires to inquire about a personal loan policy. In another embodiment of the present invention, the monitoring module 232 is configured to collect customer information from the database 114 of the contact center. The customer information may include customer's name, customer's history, customer's priority i.e., high priority customer, and low priority customer etc.

Additionally, the monitoring module 232 is configured to monitor current status of the agents available in the contact center at the time of received call request from a customer of the enterprise. The current status of the agents may include number of existing work requests being handled by the agents, type of work requests being handled, priority of the customers etc. The monitored current status of the agents may then be stored in the database 114 in the form of numerical or graphical representation such as a table, pie charts, bar graphs etc. For example, agent 1 is handling a voice call of a high priority customer, agent 2 is handling an instant messaging chat (text conference session) of a low priority customer, agent 3 is handling a voice call of a low priority customer and simultaneously having a web chat session (text conference session or group chat) with another low priority customer, and so on. The database 114 of the contact center may be updated dynamically in an embodiment of the present invention.

The analysis module 234 is configured to analyze the data collected and monitored by the monitoring module 232 in an embodiment of the present invention. Based on the analysis of the data, the attributes/parameters of the received call requests are matched with the profiles and current status of the agents available in the contact center. For example, if a received work request is related to a personal loan query and the type of the work request is a voice conversation, then an agent who is proficient in dealing with personal loan queries and may handle the voice conversation is matched. In case, if the most proficient agent who has a profile matching with the parameters of the work request is busy on another voice call, then the work request is matched with the profiles of other agents having similar profile. The matching of the parameters of the work request and profiles of the agents are then stored in the form of a numerical or graphical representation in the database 114 of the contact center.

Further, in an embodiment, the analysis module 234 is configured to match the attributes of the call request with the resources to determine a plurality of resources required for managing a communication session with the customer based on the attributes determined by the monitoring module 232. In an embodiment, the analysis module 234 may allocate only one resource for managing the customer call based on the attributes of the customer call. In another embodiment, the analysis module 234 may allocate more than one resource for managing the customer call based on the attributes of the customer call.

For example, if an irate customer calls a finance enterprise and the IVR system of the enterprise asks the customer to provide a one line summary of your call, and the irate customer shouts in angry manner "I am not satisfied with your work process in personal loan department", then the monitoring module 232 may first determine that the customer has an issue with "personal loan department" and may then determine that the customer is showing angry emotions. Based on such attributes (other attributes may also be used) the analysis module 234 may determine one or more suitable resources from the personal loan department who are proficient in handling such irate customers. In an embodiment, if the monitoring module 232 determines that the customer is a very valuable broker (determined by the IVR system) for the enterprise who puts a lot of business for the enterprise, then the analysis module may also connect the relationship manager of the broker with the suitable agents from the personal loan department.

The management module 236 is configured to manage allocation of the resources for the communication session. Further, the management module 236 is configured to refine the allocation of the resources during the communication session based on the attributes determined by the monitoring module 232. For example, the management module 236 may allocate the resources determined by the analysis module 234 to communicate with the customer. Further, if the monitoring module 232 determines that the customer just complained about another department of the enterprise, then the management module 236 may automatically add a representative from that department of the enterprise into the conference session with the customer. Furthermore, if the monitoring module determines that even after a long communication with plurality of resources, anger or frustration of the customer is increasing, then the management module 236 may again find more suitable or senior agents who are proficient in handling such customers.

In addition, the management module 236 may de-allocate at least one of the plurality of allocated resources from the communication session based on the attributes. For example, the monitoring module 232 may determine that one of the allocated resource has not spoken a word since a pre-defined time period, and hence the management module 236 may decide to de-allocate that resource from the communication session. Similarly, if monitoring module 232 detects that a resource greeted 'goodbye' to the customer then the management module 236 may automatically de-allocate the resource from the communication session.

Figure 3:
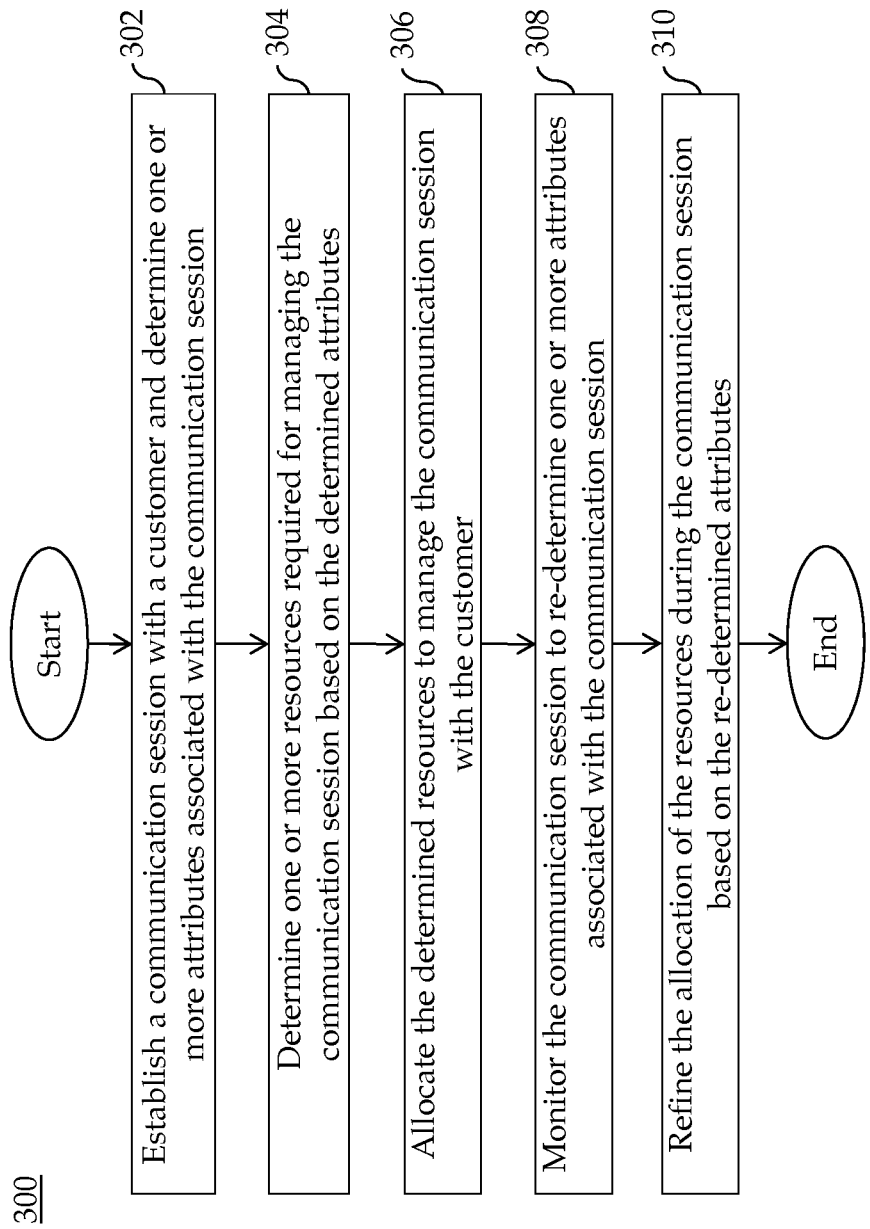
FIG. 3 depicts a flowchart of a method for allocating suitable resources to serve an on-going customer call in an enterprise, according to an exemplary embodiment of the present invention.

FIG. 3 depicts a flowchart of a method 300 for allocating suitable resources to serve an on-going customer call in an enterprise, according to an exemplary embodiment of the present invention. At step 302, a resource allocation system 224 (as described in FIG. 2 of the present invention) receives a work request (i.e., a customer call) from a customer of an enterprise and establishes a communication session with the customer. Thereafter, the resource allocation system 224 starts determining one or more attributes associated with the communication session. In an embodiment of the present invention, the attributes may include, but are not limited to, content, context, progress, and emotions detectable from the customer call. More particularly, the attributes may relate to the progress/status of the communication session, words spoken (content) in the communication session, and emotions/sentiments of the customers detectable from the call.

At step 304, the resource allocation system 224 monitors availability of resources (in the enterprise) to handle the communication session with the customer of the enterprise. Further, the resource allocation system 224 matches attributes of the communication session with a list of enterprise resources to determine one or more resources capable of managing the communication session with the customer. In an exemplary embodiment of the present invention, the one or more resources are determined based on the determined attributes of the communication session. In addition, the attributes may include, customer's pre-stored profile history or call histories, or the details provided by the customer during IVR interactions (i.e., preferred language, personal details, relevant department of the enterprise etc.)

For example, if a customer calls the contact center then resource allocation system 224 may first ask the customer to verbally define purpose of the call. The resource allocation system 224 may then analyze the reply of the customer to determine context, content, and emotion of the customer. Further, as status of the call is always known to the resource allocation system 224, therefore, the resource allocation system 224 may determine (based on the context, content, and emotion of the customer) at least one suitable agent from at least one suitable department of the enterprise.

At step 306, the resource allocation system 224 allocates at least one resource to manage the communication session with the customer. In an embodiment, based on the determined attributes, the resource allocation system 224 may allocate a plurality of resources for managing the communication session with the customer, wherein the plurality of resources may or may not belong to same department of the enterprise. Further, in an embodiment of the present invention, the plurality of resources may be communicating with the customer via a conference call, wherein the conference call may be a voice call or a video call or any other state of art teleconference call. In another embodiment of the present invention, the at least one of resources may be actively connected to the communication session and the rest of the resource may be passively attending the communication session. In yet another embodiment of the present invention, the resource allocation system 224 may enable the plurality of resources to eventually join the communication session based on content, context, and status of the communication session.

Furthermore, at step 308, the resource allocation system 224 monitors the on-going communication session between the allocated resources and the customer to re-determine the attributes associated with the communication session as the content, context, and status of the communication session may change based on progress of the communication session. Also, the emotions/sentiments of the customer may also vary in different phases of the communication session. Therefore, it is very important to continuously monitor the attributes associated with the communication session to determine if the allocation of the resources is needed to be refined or not.

At step 310, based on the attributes re-determined at step 308, the resource allocation system 224 re-accesses if the allocation of resources to manage the communication session with the customer is optimal or if the allocation is needed to be refined. Thereafter, if the resource allocation system 224 determines that due to changes detected in the attributes of the communication session, the allocation of resources must be refined, then the resource allocation system 224 may first determine whether there is a requirement to add more resources in service of the customer or whether there is at least one agent who is not further required for the service of the customer. In case, if there is at least one resource that is not further required to serve the customer then the resource allocation system 224 may automatically relieve the at least one resource from the service of the customer. However, if the resource allocation system 224 determined a need for at least one more resource who is necessarily required to manage the communication session then the resource allocation system 224 may automatically introduce the at least one resource in the on-going communication session. This method may be beneficial to significantly reduce the manual resource re-allocation time and efforts, which ultimately helps in customer satisfaction and hence improves contact center efficiency.

Further, in an exemplary embodiment of the present invention, the present invention may be advantageous to practice in case of automated Contact Center services, where the customer calls are automatically routed to suitable human agents. For example, a customer calls to a contact center and speech analysis system (comprising a natural language processor) of the contact center determines that the customer is a valuable trader for the contact center and the customer is angry about a series of problems. Therefore, based on the identified importance of the customer and customer's problems, a set of resources are identified and allocated to serve the customer in a conference call. The speech analysis system then continues to monitor interactions between the customer and the allocated resources to determine whether any progress is being achieved corresponding to the problems identified by the customer by monitoring if the anger of the customer is improving or further degrading. In case, if it is identified that the anger of the customer is further degrading then the system tries to refine the resource allocation. On the other hand, if it is determined that the anger of the customer is improving then the system may try to identify if any of the allocated resource can be relived based on the progress in the communication session with the customer.

Figure 4A:
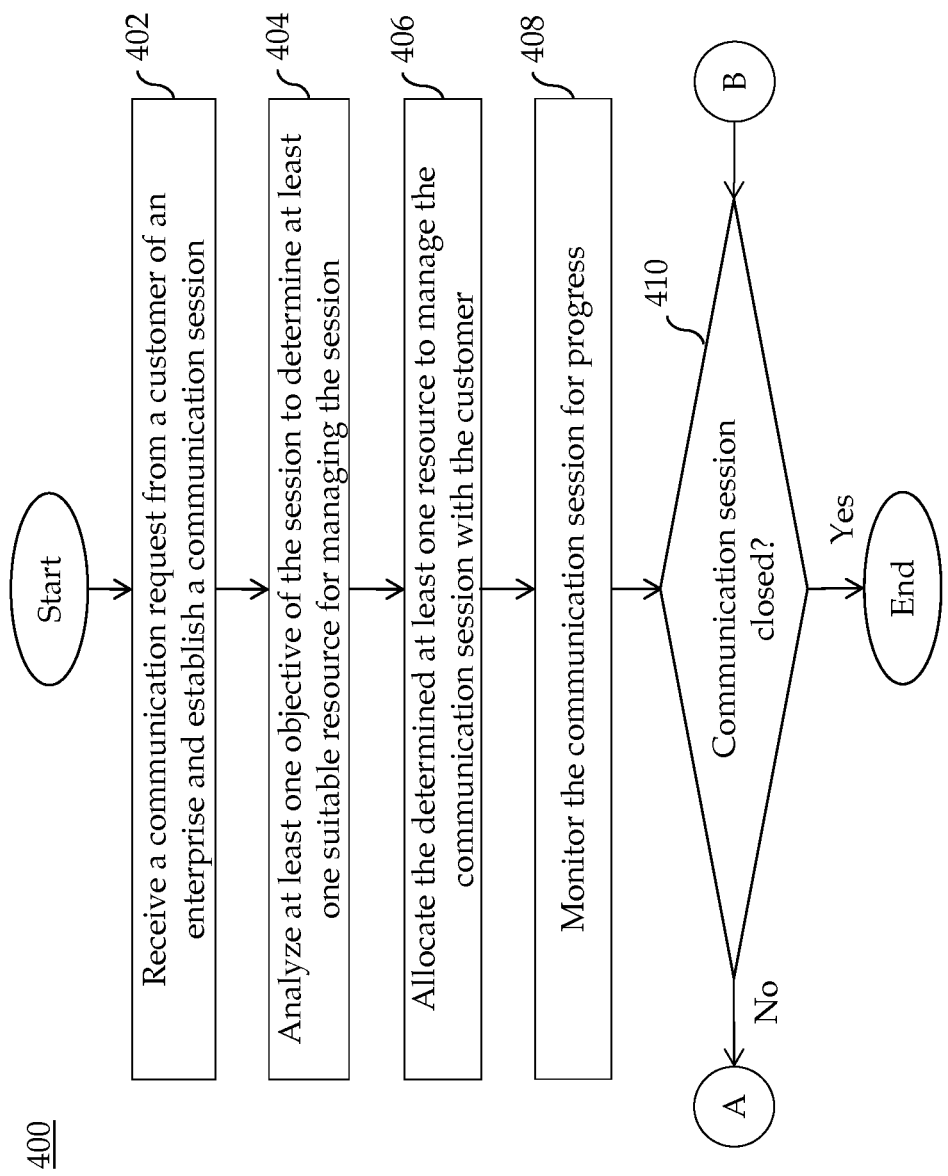
FIGS. 4A and 4B depict a flowchart of a method for ensuring allocation of a plurality of suitable resources in service of customers of an enterprise, according to an exemplary embodiment of the present invention.
Figure 4B:
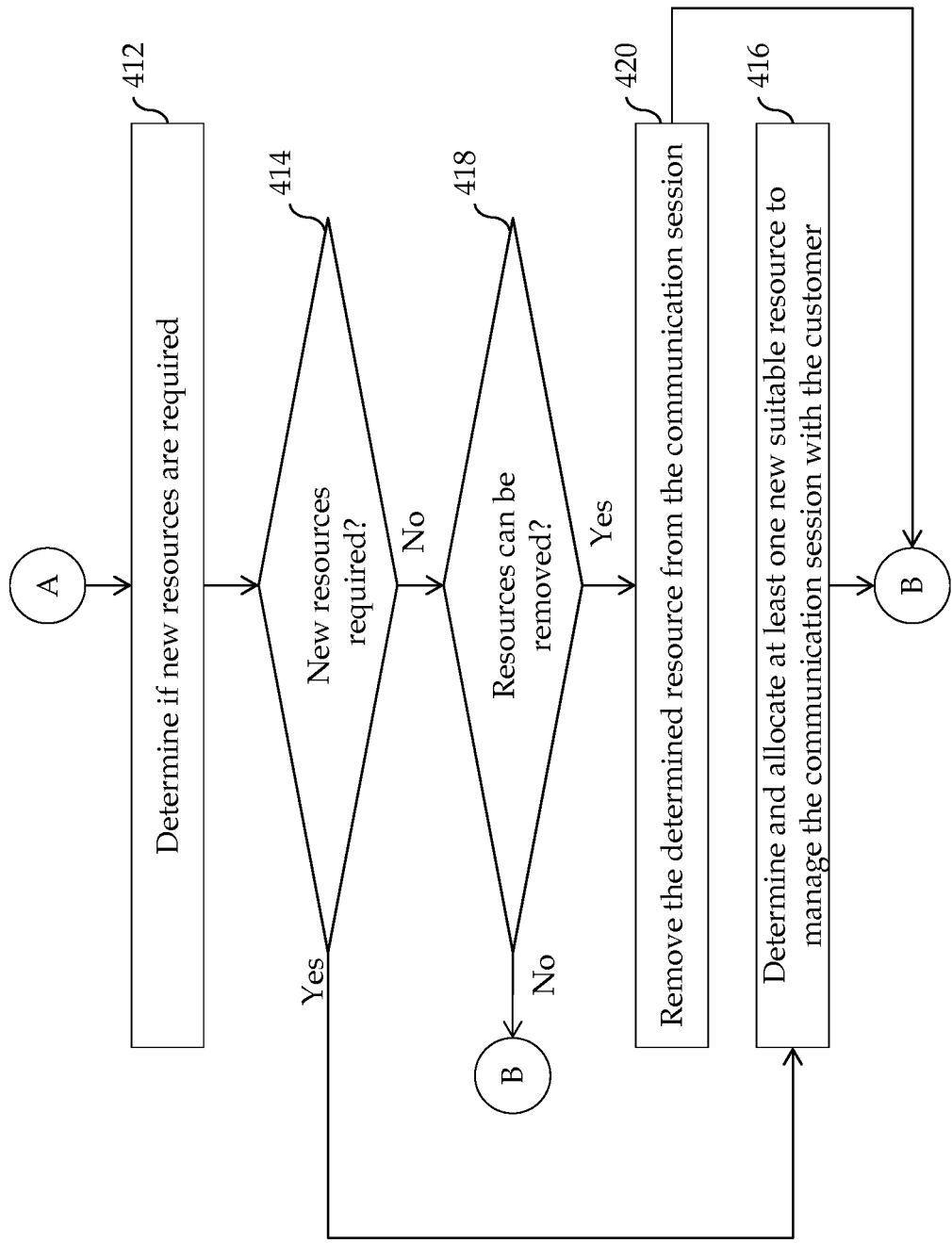

FIGS. 4A and 4B depict a flowchart of a method 400 for ensuring allocation of a plurality of suitable resources in service of customers of an enterprise, according to an exemplary embodiment of the present invention. At step 402, a resource allocation system 224 (as described in FIG. 2 of the present invention) may receive a communication call from a customer of the enterprise. The resource allocation system 224 may then establishes a communication session with the customer and facilitates the customer to face an automated IVR system that helps the customer to provide necessary details such as personal details, call purpose, preferred language etc.

In an embodiment of the present application, the communication session may be at least one of audio conference session, video conference session, and text conference session (group chat session). The text conference session may be enabled via a text chat conference mixer, which mixes chats between plurality of users onto a single chatting platform allowing all the users to chat with each other at a single platform like a group chatting platform (as known in the art).

At step 404, the resource allocation system 224 may determine objective of the customer for calling the enterprise from the data received by the IVR system. In an embodiment of the present invention, the resource allocation system 224 may determine context, content, and emotion of the customer from the data received by the IVR system. Such data may then be used to interpret the objective/purpose of the customer for calling the enterprise.

Further, the resource allocation system 224 may use at least one of speech analysis system, image analysis system, and text analysis system to determine the context, content, and emotion of the customer. Thereafter, based on the content, context, and emotion detected from the call of the customer, the resource allocation system 224 may first determine the resources available in the enterprise and may then determine the resources that are suitable for solving the objective of the customer for calling the enterprise.

In an embodiment of the present invention, the customer may have more than one objective for calling the enterprise and then the resource allocation system 224 may select more than one resource for managing the call with the customer. Further, the more than one resources may be connected with the customer via a conference call. Furthermore, the more than one resources may or may not belong to a same department of the enterprise. Furthermore, the resources may be selected based on their pre-stored profile data.

The resource profile may include self-description, skill sets, likes, languages, locations etc. The skill sets may further include resource's interests, education and work histories, hobbies, hometowns, favourite sport teams and TV shows, cultural background, and so on. Moreover, in another embodiment of the present invention, a secondary source of profile data may be utilized, i.e., social media channels (not shown in figure). In another embodiment of the present invention, the profiles of the resources of the enterprise are updated automatically at configurable intervals.

At step 406, the resource allocation system 224 may enable the determined at least one resource to establish a communication session with the customer. In case, if more than one resources are determined then the more than one resource may be connected with the customer via a conference call. Thereafter, at step 408, the resource allocation system 224 may continue monitoring the communication session for progress between the customer and the at least one resource.

At step 410, if the resource allocation system 224 determines that the allocated at least one resource has satisfied the objective of the customer for calling the enterprise, or if the communication session between the customer and enterprise resources has already been ended, then the method flow may end. Otherwise, at step 410, if the resource allocation system 224 determined that the objective of the communication session is not achieved and the communication session between the customer and the allocated resources is still going on, then the method flow may proceed to step 410.

In an embodiment of the present invention, the resource allocation system 224 may analyze the content, context, status, and emotion from the communication between the customer and the resources to determine satisfaction level of the customer. For example, the resource allocation system 224 may determine improvement in the emotion or behavior of the customer during communication up to a pre-set threshold, and then resource allocation system 224 may analyze the context and content of the communication to further confirm the satisfaction level of the customer.

At step 410, after determining that the customer is not satisfied, the resource allocation system 224 may determine status of other available resources in the enterprise that have seniority in comparison to the already allocated resources. Further, the resource allocation system 224 may also analyze the content of the communication to determine if the customer has mentioned a new issue or new requirement or if the customer is demanding for resources having a specific skill set. Based on the determination of new requirements or dissatisfaction of the customer, at step 412, the resource allocation system 224 may determine whether or not there is a requirement to add more/new suitable resources in the conference session with the customer.

Further, at step 414, if the resource allocation system 224 determined that there is a requirement to add new resources in the conference call with the customer, then the method flow may proceed to step 416. Otherwise, if the resource allocation system 224 determined that there is no requirement of allocating more resources then the method flow may step back and start again from step 408 to monitor the progress between the customer and the allocated resources. Thereafter, at step 416, based on the determined requirement of new resources to serve the customer, the resource allocation system 224 may search for all the available resources that match with the newly discovered customer requirements. Further, at step 416, the newly searched resources are introduced in the conference session between the customer and the previously allocated resources.

At step 418, the resource allocation system 224 may analyze at least one resource whose necessity in the conference call is over and is not further helpful for the customer. Therefore, if the resource allocation system 224 determined that there is no one from the conference call who is further not required to serve the customer, then the method flow may step back and start again from step 408. However, if the resource allocation system 224 determined that there is at least one resource available in the conference session who is further not required by the customer for interaction, then the method flow may proceed to step 420.

At step 420, the resource allocation system 224 may remove the determined at least one resource from the communication session with the customer. In an embodiment, the process of removal of the resource from the communication session may be automatic and the customer may not be notified for the same. In another embodiment of the present invention, the process of removal of the resource from the communication session may be automatic and the customer will be notified through a suitable message for the same. In yet another embodiment of the present invention, the resource may be asked by the system to inform the customer before being automatically removed by the system. In still another embodiment of the present invention, the resource allocation system 224 may detect the content of the communication to determine if a resource is required to be removed from the communication. For example, the resource allocation system 224 may detect certain keywords like 'bye' or 'thanks for calling' etc., to determine if a resource (who spoke such keywords) is required to be removed from the communication session. Thereafter, the method flow may loop back to step 408 where the resource allocation system 224 monitors the progress between the customer and the allocated resources.

In an exemplary embodiment of the present invention, the resource allocation system 224 may receive a call from a customer of an enterprise. The resource allocation system 224 may then use the IVR system and at least one of the speech analysis system, image analysis system, and text analysis system to determine objective of the customer to call the enterprise. Further, the resource allocation system 224 may then identify one or more resources from the enterprise for managing the call with the customer, wherein the one or more resources are identified based on the determined objective of the customer for calling the enterprise. Thereafter, the resource allocation system 224 may monitor the interactions between the customer and the allocated resources to determine whether or not the customer is being satisfied with the communication. In an embodiment of the present invention, the satisfaction level of the customer may be determined by analyzing emotions of the customers. Further, the emotions of the customer may be identified using the speech analysis system and/or image processing system (in case of video conference) and/or text analysis system (in case of group text chat or text conference session). Therefore, based on the detected emotions of the customer, the resource allocation system 224 may determine whether or not to change the allocation of the resources. For example, if the resource allocation system 224 determined that the customer is getting angry or frustrated with the progress in the communication session, then the resource allocation system 224 may either remove a resource from the communication session (who is causing distress in the emotion of the customer) or may add another resource (who may be an expert or senior authority) for managing the communication session with the customer. In this manner, the resource allocation system 224 may continue to alter the resource allocation for managing the customer interaction based on the distress or improvement in the emotion of the customer.

Further, the following example is described in light of the essence of the present invention and therefore, discloses an exemplary embodiment of the present invention. In an exemplary embodiment of an assisted Contact Center service, a customer call enters into a business process as defined by Avaya Collaboration Designer. The optimal attributes needed to satisfy the caller are extracted as part of the customer profiling/segmentation portion of the business process. A match request is made to Avaya Work Assignment for an agent that has the desired attributes. After a period of time, the business process relaxes some of the attributes in order to meet service level. The attributes which have been avoided remain associated with the call. Avaya work assignment returns an agent resource that matches the relaxed set of attributes, and the caller is connected to the agent. Sometime later, the work assignment engine has an agent available with all of the originally requested attributes. A notification is sent to the business process. Based on the caller profile, the business process interrupts the in-process call and allows the more specialized agent to greet the customer and take over the call. All context and associated data associated with the call is now accessible to the new agent.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for managing an on-going communication session involving a customer of an enterprise and a plurality of human agents of the enterprise allocated to the on-going communication session, comprising:
    a processor;
    a storage device in communication with the processor and storing executable instructions, the executable instructions when executed by the processor cause the processor to:
        monitor one or more attributes associated with the on-going communication session;
        determine whether the plurality of human agents is an optimal number of agents allocated to the on-going communication session, based on the monitored attributes; and
        automatically change the number of the plurality of human agents allocated to the on-going communication session when the determined plurality of human agents is not the optimal number.

2. The system of claim 1, wherein the on-going communication session is a conference session.

3. The system of claim 2, wherein the conference session comprises at least one of an audio conference session, a video conference session, or a text conference session.

4. The system of claim 1, wherein the attributes associated with the on-going communication session comprises at least one of a content, a context, a status, or an emotion.

5. The system of claim 4, wherein the attributes associated with the on-going communication session are determined via at least one of a speech analysis system, an image analysis system, or a text analysis system.

6. The system of claim 1, wherein the executable instructions, when executed by the processor, cause the processor to de-allocate a particular one of the plurality of human agents allocated to the on-going communication session, but not others of the plurality of human agents allocated to the on-going communication session, when the number of the plurality of human agents allocated to the on-going communication session is above the optimal number.

7. A computer-implemented method for managing an on-going communication session involving a customer of an enterprise and a plurality of human agents of the enterprise allocated to the on-going communication session, the method comprising:
    monitoring, by a computer system of the enterprise, one or more attributes associated with the on-going communication session;
    determining, by the computer system of the enterprise, whether the plurality of human agents is an optimal number of human agents allocated to the on-going communication session, based on the monitored attributes; and
    automatically changing, by the computer system of the enterprise, the number of the plurality of human agents allocated to the on-going communication session when the determined plurality of human agents is not the optimal number.

8. The computer-implemented method of claim 7, wherein the on-going communication session is a conference session.

9. The computer-implemented method of claim 8, wherein the conference session comprises at least one of an audio conference session, a video conference session, or a text conference session.

10. The computer-implemented method of claim 7, wherein the attributes associated with the on-going communication session comprises at least one of a content, a context, a status, or an emotion.

11. The computer-implemented method of claim 7, wherein the attributes associated with the on-going communication session are determined via at least one of a speech analysis system, an image analysis system, or a text analysis system.

12. The computer-implemented method of claim 7, wherein automatically changing the number of the plurality of human agents allocated to the on-going communication session comprises:
    de-allocating a particular one of the plurality of human agents allocated to the on-going communication session, but not others of the plurality of human agents allocated to the on-going communication session, when the number of the plurality of human agents allocated to the on-going communication session is above the optimal number.

13. The system of claim 1, wherein the executable instructions, when executed by the processor, cause the processor to automatically add an additional human agent to the plurality of human agents allocated to the on-going communication session when the number of the plurality of human agents allocated to the on-going communication session is below the optimal number.

14. The computer-implemented method of claim 7, wherein automatically changing the number of the plurality of human agents allocated to the on-going communication session comprises:

adding an additional human agent to the plurality of human agents allocated to the on-going communication session when the number of the plurality of human agents allocated to the on-going communication session is below the optimal number.

15. The system of claim 1, wherein the executable instructions, when executed by the processor, cause the processor to determine a plurality of objectives of the customer of the enterprise for contacting the enterprise.

16. The system of claim 15, wherein the executable instructions, when executed by the processor, cause the processor to determine the plurality of human agents based on the determined plurality of objectives of the customer of the enterprise.

17. The system of claim 16, wherein the plurality of human agents are from different departments of the enterprise.

18. The computer-implemented method of claim 7, comprising:
  determining, by the computer of the enterprise, a plurality of objectives of the customer of the enterprise for contacting the enterprise.

19. The computer-implemented method of claim 18, comprising:
  determining, by the computer of the enterprise, the plurality of human agents based on the determined plurality of objectives of the customer of the enterprise.

20. The computer-implemented method of claim 19, wherein the plurality of human agents are from different departments of the enterprise.

* * * * *